United States Patent
Sauntry et al.

(10) Patent No.: US 6,353,838 B2
(45) Date of Patent: Mar. 5, 2002

(54) INCREMENTAL GARBAGE COLLECTION

(75) Inventors: David M. Sauntry; Michael E. Markley, both of Redmond, WA (US); Mark Gilbert, Mount Pleasant, SC (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 09/893,245

(22) Filed: Jun. 27, 2001

Related U.S. Application Data

(63) Continuation of application No. 08/994,098, filed on Dec. 19, 1997, now abandoned.

(51) Int. Cl.[7] .............................................. G06F 17/30
(52) U.S. Cl. ....................... 707/206; 707/205; 707/200
(58) Field of Search ................................ 707/206, 205, 707/200

(56) References Cited

U.S. PATENT DOCUMENTS

| | | | |
|---|---|---|---|
| 4,797,810 A | * 1/1989 | McEntee et al. | 707/206 |
| 5,088,036 A | * 2/1992 | Ellis et al. | 707/206 |
| 5,136,706 A | 8/1992 | Hildebrant | 711/154 |
| 5,535,390 A | 7/1996 | Hildebrandt | 395/700 |
| 5,560,003 A | * 9/1996 | Nilsen et al. | 707/206 |
| 5,848,423 A | * 12/1998 | Ebrahim et al. | 707/206 |
| 5,873,104 A | * 2/1999 | Tremblay et al. | 707/206 |
| 5,893,121 A | * 4/1999 | Ebrahim et al. | 707/206 |
| 5,960,087 A | 9/1999 | Tribble et al. | 380/49 |
| 6,047,295 A | * 4/2000 | Endicott et al. | 707/206 |
| 6,070,173 A | * 5/2000 | Huber et al. | 707/206 |

OTHER PUBLICATIONS

"International Search Report for International Application No. PCT/US 98/26769", *Completion Date—Apr. 9, 1999; Authorized Officer Ahmed Soliman*, 7 Pages, (Apr. 19, 1999).

Katzberg, J. D., et al., "Garbage Collection Software Integrated with the System Swapper in a Virtual Memory System", *IEEE WESCANEX 93*, Communications, computers and power in the modern environment, pp. 184–191, (May 17, 1993).

Shapiro, M., "A fault–tolerant, scalable, low–overhead distributed garbage detection protocol", *IEEE*, pp. 208–217, (Jun. 1991).

\* cited by examiner

*Primary Examiner*—Jean R. Homere
*Assistant Examiner*—Greta Robinson
(74) *Attorney, Agent, or Firm*—Workman, Nydegger, Seeley

(57) ABSTRACT

An incremental garbage collector is disclosed. Upon termination of a function or program, the incremental garbage collector scans the object heap for objects allocated by the function or program that are not referenced outside the function or program that allocated the objects. Memory occupied by such objects is immediately reclaimed without having to wait for the garbage collector.

28 Claims, 6 Drawing Sheets

INCREMENTAL GARBAGE COLLECTION

RELATED APPLICATIONS

This application is a continuation of U.S. application Ser. No. 08/994,098, filed Dec. 19, 1997 now abandoned.

FIELD OF THE INVENTION

The present invention relates generally to computer systems and more specifically to managing the memory portions of such systems.

BACKGROUND OF THE INVENTION

Many computer systems manage information by the use of objects. An object is data that share a particular attribute and occupy a region of random access memory (RAM). Objects are not permitted to overlap in memory. Live objects are those needed in the computational process currently being performed by a computer system. If all objects in a system are live at all times, then there is no concern about memory management. The space assigned to each object at system startup need never be reclaimed. In most systems, however, live objects have varying lifetimes that cannot be predicted in advance. In such systems, some method of recognizing expired or dead objects and evicting them from memory is necessary if memory resources are to be conserved.

Garbage refers to data stored in computer system memory that is no longer being used in the performance of a program, method, function, or subroutine that allocated such data. For purposes of convenience, a program, method, function, or subroutine that allocates data will be referred to simply as a program or function. Garbage collection is the process of locating data in dynamically-allocated memory that is no longer being used and reclaiming the memory to satisfy future memory allocation requests. Garbage collection offers the potential of significant programmer productivity gains because with garbage collection, programmers need not worry about removing data from memory when no longer needed when the program is ended. Hence, garbage collection encourages programmers and system designers to dedicate their efforts to higher-level pursuits, such as the design of fundamental algorithms, user interfaces, and general program functionality. Also, by eliminating many low-level programming concerns, garbage collection reduces the likelihood of programming errors. These benefits of garbage collection combine together to offer improved software functionality and reliability for lower development costs.

Garbage collection can occur in a number of situations. For example, when the amount of memory remaining in available memory falls below some pre-defined level, garbage collection is performed to regain whatever memory is recoverable. Also, a program or function can force garbage collection by calling the garbage collector. Finally, the garbage collector may run as a background task that searches for objects to be reclaimed. But however they may be invoked, traditional garbage collectors work by periodically halting execution of system programs in order to traverse all of memory in search of memory regions that are no longer in use. Traditional garbage collectors have a number of major shortcomings. One such shortcoming is that, in terms of rates of allocation and deallocation of objects, storage throughput is generally much lower than, for example, stack allocation. Also, the times required to allocate memory are only very loosely bounded X the bounds on allocation times are not tight enough to allow reliable programming of highly-interactive or real-time systems such as mouse tracking, interactive multimedia device control, and viral reality systems. Finally, in some garbage collectors, the performance penalties associated with memory reads and writes are so high that overall system performance may be unacceptably slow.

These concerns are further exacerbated in systems with inherent limitations and particularities. For example, Microsoft Windows CE is a compact, efficient and scalable operating system that may be used in a wide variety of embedded products, from hand-held PCS to specialized industrial controllers and consumer electronic devices. Many devices that utilize Microsoft Windows CE are intended to have a relatively low amount of random-access memory (RAM), such as one megabyte, to ensure that the devices remain low in cost, compact in size, and efficient in the usage of power. Moreover, devices designed to utilize Microsoft Windows CE typically have less powerful processors than what is typically found on computers designed to run more powerful operating systems like Microsoft Windows NT. For systems with such inherent limitations and particularities, it is essential to maximize the amount of memory available. There is a need to effectively and efficiently maximize the amount of memory available in such systems.

SUMMARY OF THE INVENTION

The present invention is directed to a method for removing as many temporary objects as possible during the execution of a program or function so that a main garbage collector is not triggered.

Certain commands in the program allocate objects, whereas other commands do not. Typically, such objects are allocated from a heap. In one aspect of the present invention, if a program command does allocate an object, information is stored on such object that will facilitate its identification at a later time after the program terminates. Such information comprises, for example, thread identification, stack number, and a mark bit.

The present invention allows for the reclamation of such space without waiting for the main garbage collector. During the execution of a program, if an allocated object is never stored into another object such object can be discarded and the space that it occupied can be reclaimed. In other words, if the main garbage collector is activated, the space occupied by such object would be reclaimed. Hence, one of the advantages of the present invention is the freeing up of memory at a time sooner than when the garbage collector performs its task, because as noted above the present invention allows for the reclaiming of space as soon as the program that allocated such space is terminated. Furthermore, instead of scanning the whole heap, as the garbage collector would, the incremental garbage collector of the present invention allows for the scanning of only the allocated portion of the heap, instead of the entire heap.

DETAILED DESCRIPTION OF THE EMBODIMENTS

In the following detailed description, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that structural changes may be made without departing from the spirit and scope of the present invention. Therefore, the following detailed description is not to be taken in a limiting sense, and the scope of the present invention is defined by the appended claims.

There are three sections in the detailed description. The first section describes the hardware and operating environment with which embodiments of the invention may be practiced. The second section presents a system level description of one embodiment of the invention. Finally, the third section provides methods for an embodiment of the invention.

Hardware and Operating Environment

Figure 1:
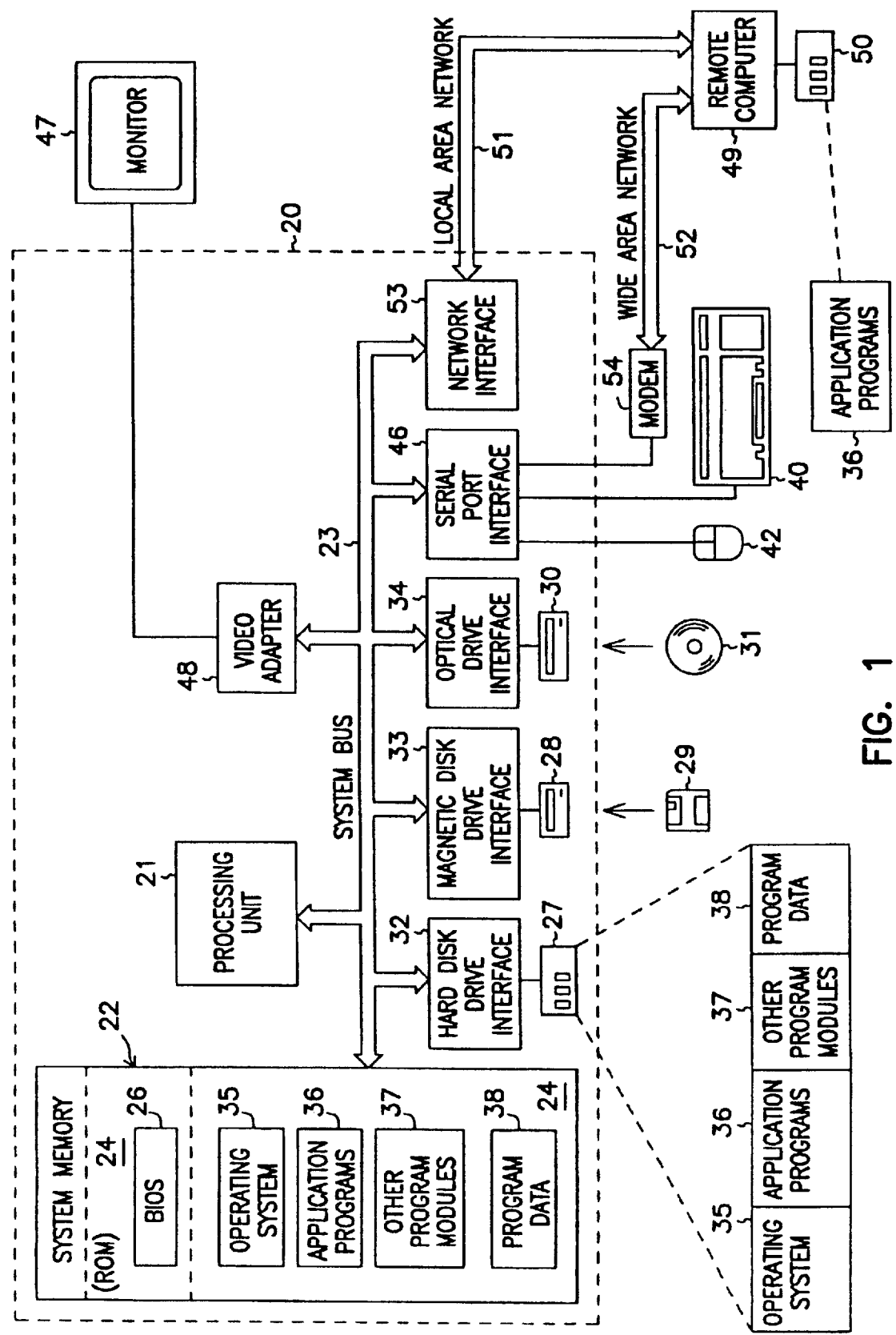
FIG. 1 is a block diagram of the hardware and operating environment in conjunction with which embodiments of the invention may be practiced.

FIG. 1 is a diagram of the hardware and operating environment in conjunction with which embodiments of the invention may be practiced. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCS, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components include the system memory to the processing unit 21. There may be only one or there may be more than one processing unit 21, such that the processor of computer 20 comprises a single central processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

The hardware and operating environment in conjunction with which embodiments of the invention may be practiced has been described. The computer in conjunction with which embodiments of the invention may be practiced may be a conventional computer, a distributed computer, or any other type of computer; the invention is not so limited. Such a computer typically includes one or more processing units as its processor, and a computer-readable medium such as a memory. The computer may also include a communications device such as a network adapter or a modem, so that it is able to communicatively couple other computers.

System Level Overview

Figure 2A:
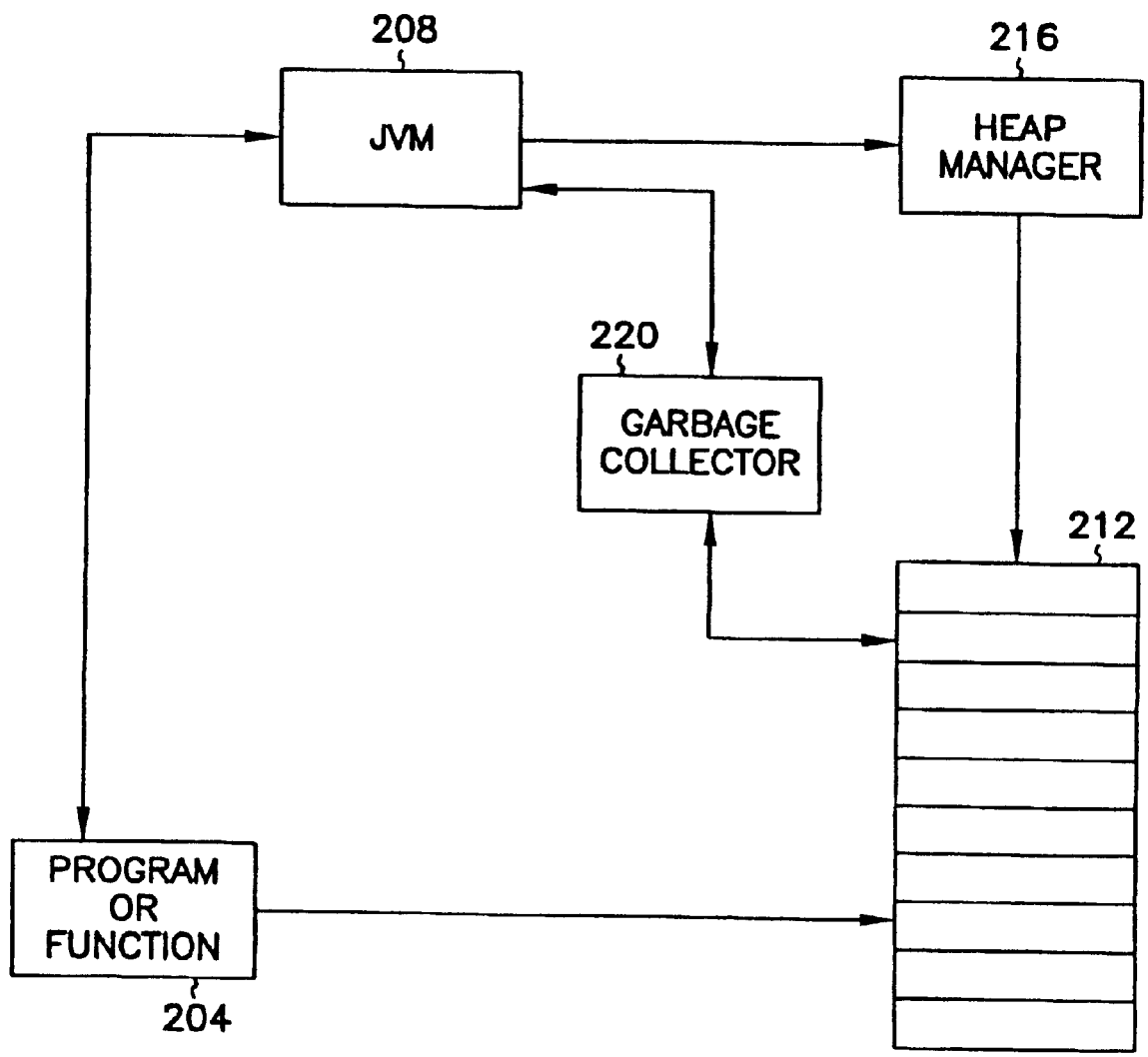
FIG. 2(a) is a block diagram of the system level overview of a technique for removing temporary objects.

FIG. 2(a) shows a system level overview of a technique for removing temporary objects during the operation of a program or function 204 within the environment of a Java Virtual Machine (JVM) 208. JVM is a native program running within an operating system to interpret and execute program or function 204. Program or function 204 in this implementation is Java code.

During execution of program or function 204, certain commands can cause the allocation of objects off a heap 212, for example by the referencing by a variable to an object. Heap manager 216 keeps track of an address in heap 212 from where objects can be allocated. As more and more objects get allocated off heap 212, it is possible for a heap manager 216 to request the operating system for additional memory space. When an object is allocated off heap 212, said object also has a reference count associated with it. Whenever a reference goes out of scope, the reference count of the object that the variable referenced is decremented. Any object with a reference count of 0 is a candidate for garbage collection.

Garbage collector 220, when activated, scans heap 212 for objects with reference count of 0 and makes available the memory occupied by the object for future use. The operation of garbage collector 220 is known in the art, but essentially Java performs garbage collection under the following circumstances: (1) whenever it is needed X when the amount of memory remaining in heap 212 falls below some predefined level, garbage collection is performed to regain whatever memory is recoverable; (2) whenever garbage collection is requested X garbage collection can be forced in Java by calling System.gc, which is the Java garbage collector, or (3) whenever Java executes a background task that searches for objects to be reclaimed.

Figure 2B:
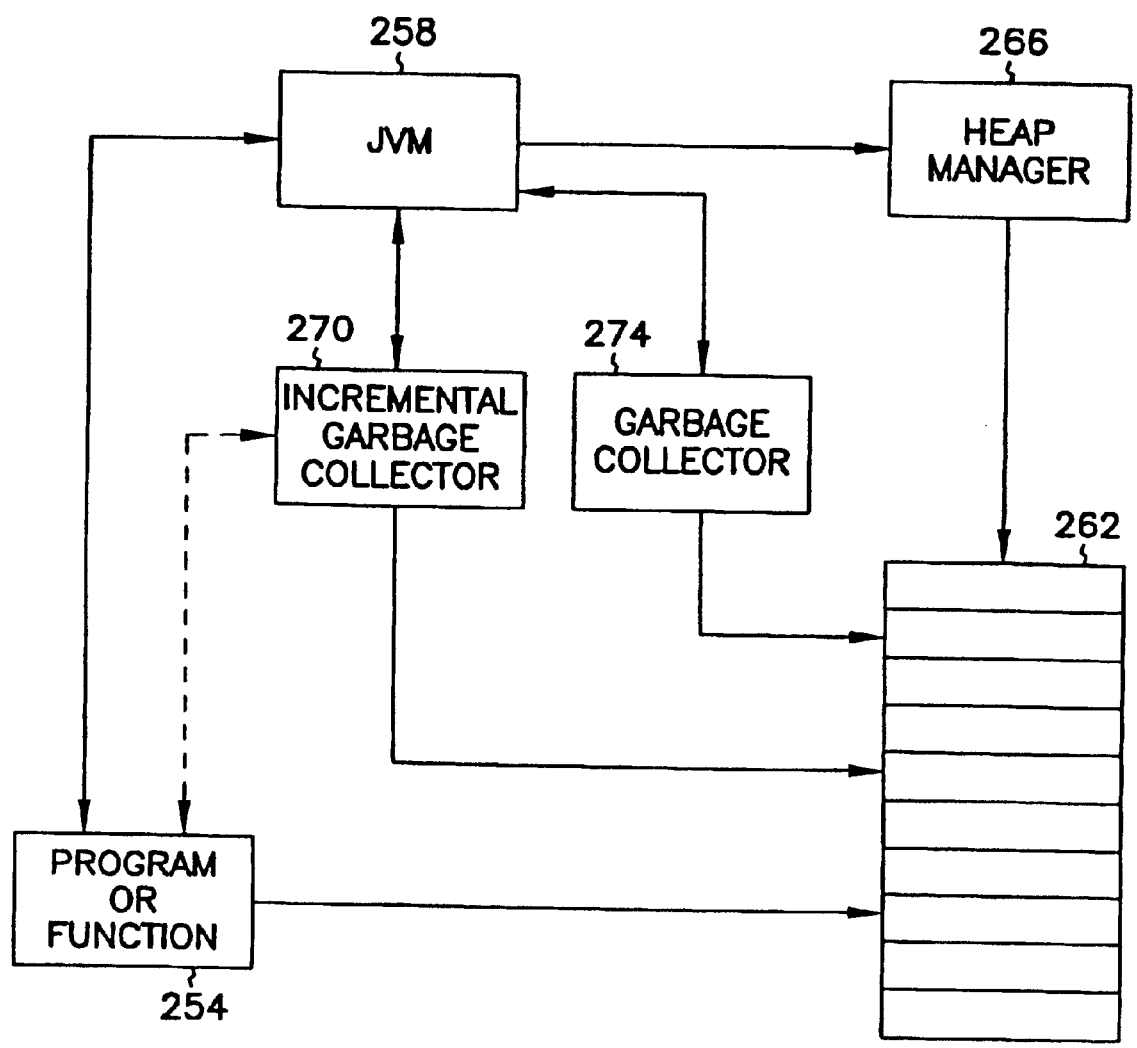
FIG. 2(b) is a block diagram showing incremental garbage collection module as an embodiment of the present invention.

FIG. 2(b) shows incremental garbage collector 270 as an embodiment of the present invention. The incremental garbage collector 270 is an integral part of the JVM. As in the prior art, heap manager 266 keeps track of an address in heap 262 from where objects can be allocated. Once function 254 is activated or executed, the incremental garbage collector 270 saves the address from the heap manager 266 indicating the next memory from which objects can be allocated. Once function 254 exits, the incremental garbage collector 270 saves the address of the last object allocated off heap 262. During execution of function 254 within the environment of JVM 258, when objects are allocated off heap 262, additional information is stored in the object that will facilitate the identification at a later time of such object by incremental garbage collector module 270.

Moreover, as previously noted, the incremental garbage collector 270 has information concerning the area of the heap allocated by function 254 X essentially the beginning address and ending address of the objects allocated off the heap 262. As soon as program or function 254 terminates or exits, incremental garbage collector module 270, starting from the beginning address to the ending address of the objects allocated off the heap, scans through the heap and reads the additional information stored in the objects. If the incremental garbage collector 270 identifies an object as garbage, it immediately reclaims space occupied by such object and makes it available for use. Hence, the incremental garbage collector 270 reclaims the space occupied by the object without waiting for garbage collector 274 to operate. Additionally, the incremental garbage collector 270 need not scan through the whole heap but only from the beginning address to the ending address of the allocated area of the heap, instead of the entire heap.

Although the garbage collector 220 and 270 were described above in terms of reference counting technique, other techniques for garbage collection are known in the art. These other techniques include, for example, deferred reference counting, mark-sweep collection, mark-compact collection, and copying garbage collection.

Methods of an Embodiment of the Invention

The previous section described on a system level the operation of an embodiment of the invention. This section describes methods performed by a computer of such an embodiment.

Figure 3:
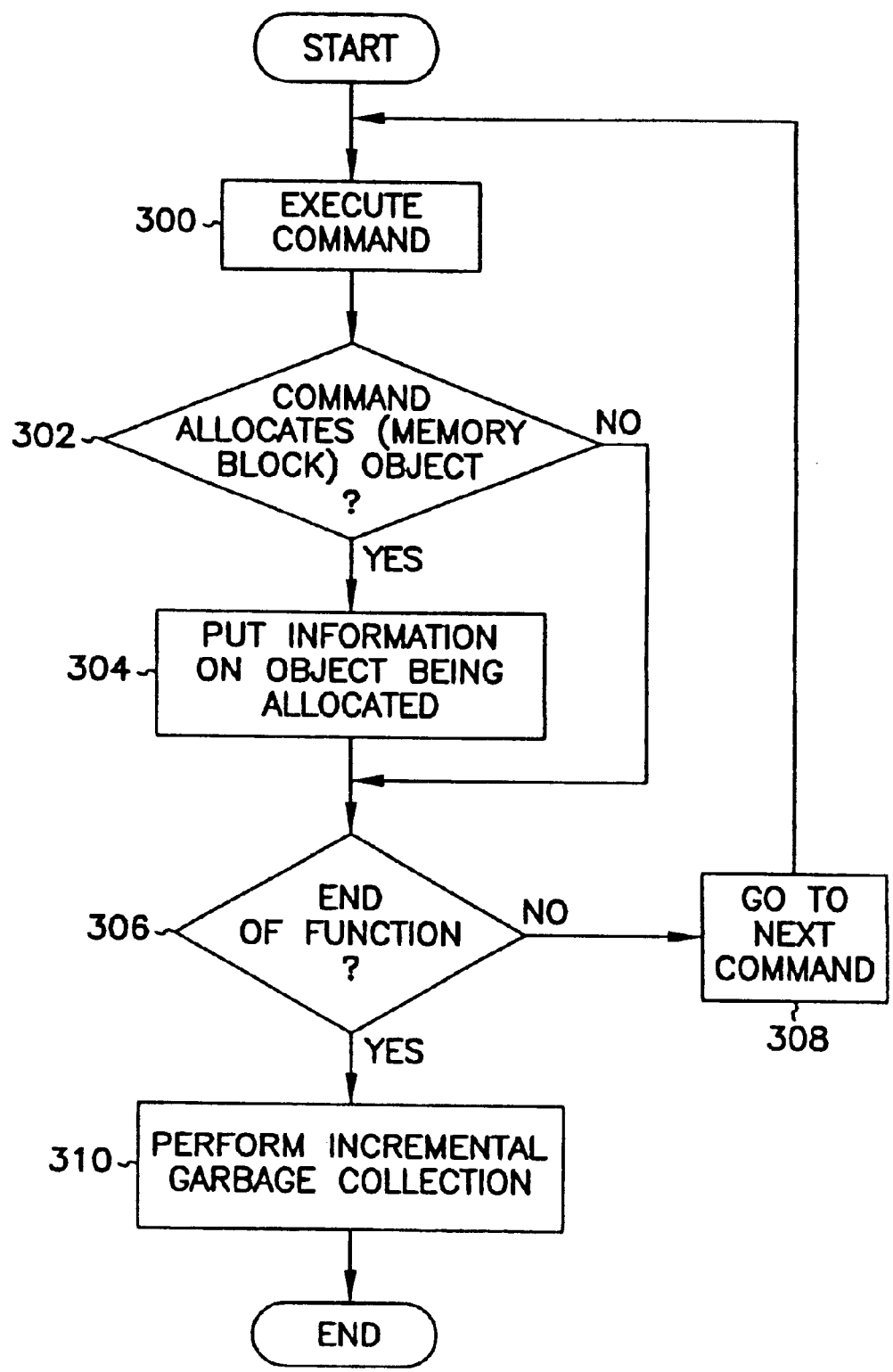
FIG. 3 is a flowchart of the process of allocating objects off the heap.

In Step 300, in the flowchart of FIG. 3, a program or function command or code is executed. Step 302 determines whether the code being executed requires the allocation of objects off the heap. If Step 302 determines that the code does not allocate objects off the heap, control is transferred to Step 306. Otherwise, if Step 302 determines that the code allocates objects off the heap, control is transferred to Step 304.

In Step 304, information about the object is stored in the object being allocated. The information stored in the object is discussed more fully below. Control then proceeds with Step 306, which determines whether the end of the program or function has been reached. If the end of the program or function has not been reached, the next command is fetched in step 308 and control is then transferred to step 300. However, if step 306 determines that the end of the program or function has been reached, incremental garbage collection is performed in step 310.

Figure 4:
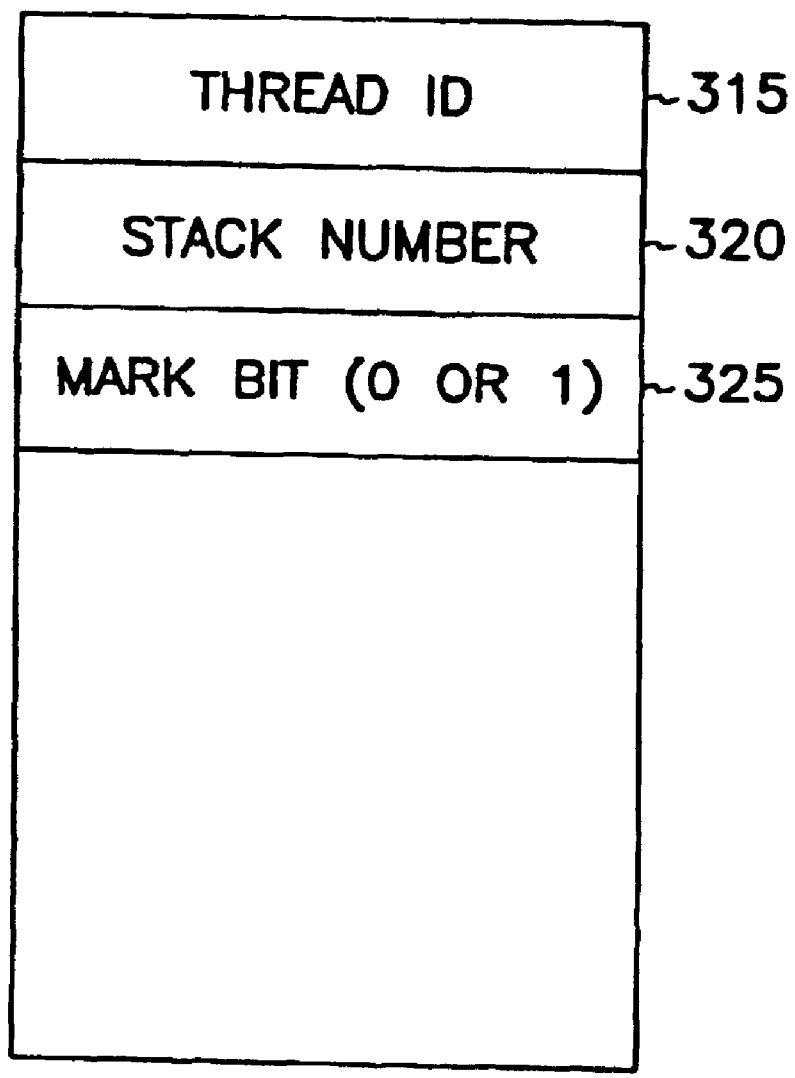
FIG. 4 shows the additional information stored in an object being allocated in the object heap.

FIG. 4 shows the information added to the object, as discussed above. This information comprises (1) thread identification 315 for the function or program allocating the object, (2) a function or stack number 320, and (3) a mark bit 325, which, if set, indicates that the object is stored outside of the function in any way. The thread identification 315 is retrieved from either the operating system or the JVM, and is known in the art. The function or stack number 320 is a way of indicating which function allocated the object. When a function (Afunction1≅) calls another function (Afunction2≅), both will have the same thread identification. It is important that when function2 exits and the incremental garbage collector is activated that objects allocated by function1 are still available to function1.

The mark bit 325 is set, as previously noted, if the object is stored outside of the function in any way. An object that is not stored outside of the function that allocated the object is referred to as local to the function. For example, the mark bit 325 is set when the object is stored into a global variable, returned, or thrown as an exception.

Ordinarily, the mark bit 325 is also set for an object (Aobject1≅) if object1 is stored into another object (Aobject2≅). However, if object2 (into which object1 is stored) was allocated in the same function that allocated object1 and object2 is not referenced outside of the same function, then the mark bit 325 is not set for either object1 or object2. However, if the mark bit 325 of object2 is later set, then the incremental garbage collector examines all of objects stored in object2. If an object stored in object2 does not have its mark bit set, the incremental garbage collector sets the mark bit at such time. Additionally, the mark bit 325 for the object being used is also set whenever any of the following commands is executed: AASTORE, ARETURN, ATHROW, PUTFIELD, PUTFIELD_FAST, PUTSTATIC, or PUTSTATIC_FAST. This list is not exhaustive X as a general rule, the mark bit 325 is set for objects used by commands (such as the ones listed) that may or do store the objects outside the function.

Figure 5:
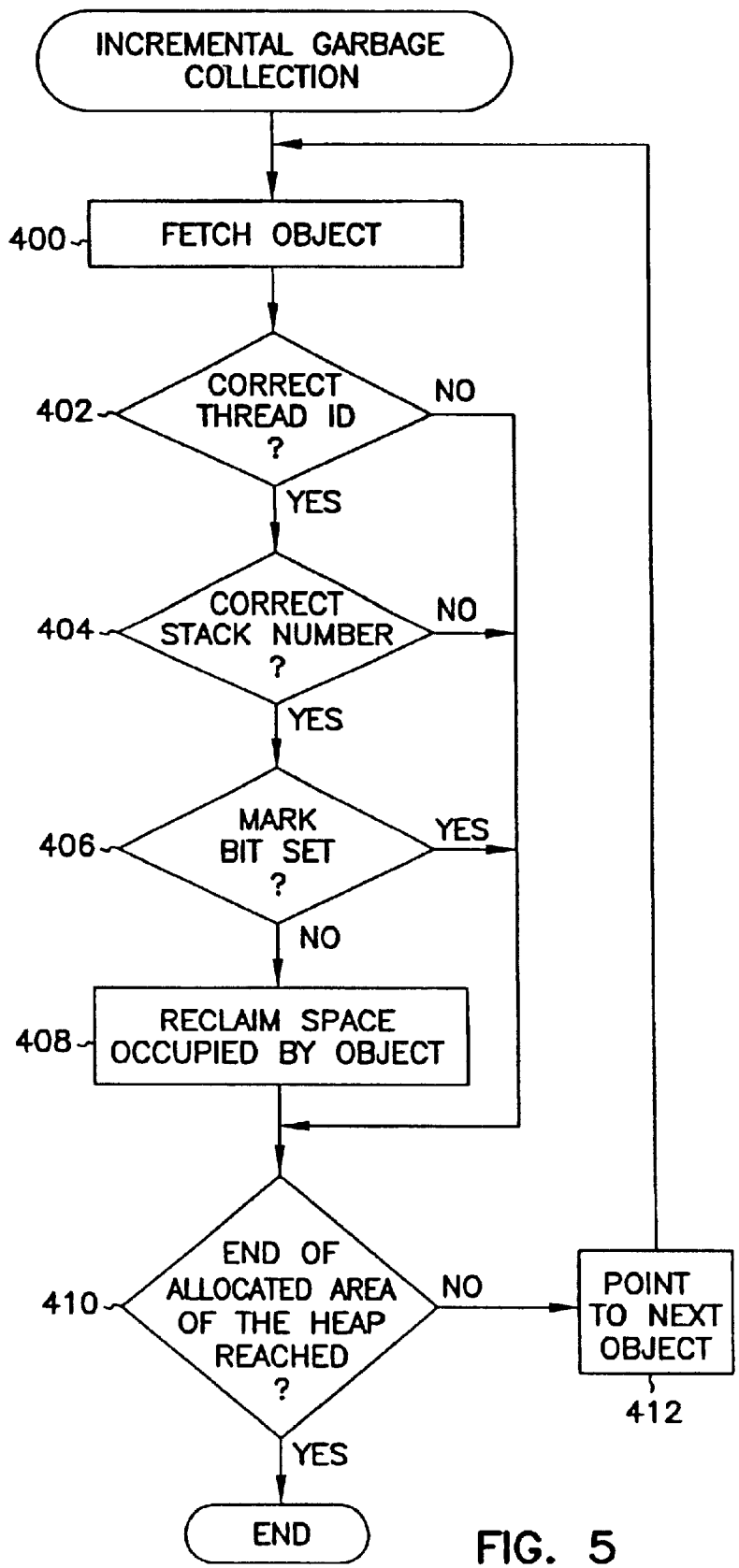
FIG. 5 shows the steps taken by the incremental garbage collector module as it scans through the heap and reads the additional information stored in the objects.

FIG. 5 shows the steps taken by the incremental garbage collector module as it scans through the heap and reads the additional information stored in the objects. The incremental garbage collector fetches an object off the heap in Step 400, and then in Step 402 determines whether the thread identification stored in the object corresponds to the thread identification of the function or program that called the incremental garbage collector. If the thread identification of the object does not correspond, control is transferred to Step 410. If the thread identification corresponds, control is transferred to Step 404, which determines whether the stack number corresponds to the number assigned by the calling function. If the stack number does not correspond, control is transferred to Step 410. If the stack number corresponds, control is transferred to Step 406, which determines whether the mark bit stored in the object is set. If the mark bit is set, control is transferred to Step 410. If the mark bit is not set, the space occupied by the object is reclaimed in Step 408, and control is transferred to Step 410. Step 410 determines whether the end of the object heap has been reached. If the end of the object heap has not been reached, the incremental garbage collector points to the next object as shown in Step 412 and control is transferred to Step 400. Otherwise, if the end of the object heap has been reached, the incremental garbage collector terminates.

Conclusion

It is to be understood that the above description is intended to be illustrative, and not restrictive. Many other embodiments will be apparent to those of skill in the art upon reviewing the above description. The scope of the invention should, therefore, be determined with reference to the appended claims, along with the fill scope of equivalents to which such claims are entitled.

What is claimed is:

1. In a computer system that includes a processing unit, a system memory, and a plurality of program modules, wherein at least a portion of the system memory comprises a heap from which objects may be dynamically allocated, and wherein the plurality of program modules include one or more programs or functions dynamically allocating memory from the heap for one or more objects and a main garbage collector that typically examines the entire heap when periodically attempting to reclaim memory dynamically allocated by the one or more programs or functions for the one or more objects, a method of reclaiming at least some dynamically allocated memory associated with the one or more objects immediately after the function or program that allocated the one or more objects either terminates or exits rather than waiting for the main garbag collector, the method comprising:

an act of, for an object that has been allocated, storing additional information within the object itself that includes a marker indicating whether the object is local to the function or program that dynamically allocated the object in the first instance;

an act of, immediately after the function or program that initially dynamically allocated the object either terminates or exits and prior to when the main garbage collector attempts to reclaim memory, examining the additional information for at least one object allocated by the function or program to determine if the at least one object has a marker indicating that it is local to the function or program;

if the at least one object is local to the function or program, then performing a step for reclaiming the dynamically allocated memory associated with the at least one object; and if the at least one object is not local to the function or program, then performing a step for deferring to a later time any further attempt to reclaim the dynamically allocated memory associated with the at least one object.

2. A method as recited in claim 1, further comprising acts of:

prior to allocating any object, saving a beginning heap location from which objects may be dynamically allocated;

saving an ending heap location of a last object to be dynamically allocated; and between the beginning heap location and the ending heap location, fetching one or more objects from the heap to examine the additional information for each of the one or more objects and to determine if each of the one or more objects is local, wherein the fetching includes the at least one object.

3. A method as recited in claim 2, wherein the additional information includes a thread identifier and a stack identifier, the method further comprising an act of examining the additional information for each of the one or more objects fetched from the heap to determine which of the one or more objects fetched from the heap were allocated by the program or function.

4. A method as recited in claim 1, further comprising acts of:

continuously monitoring the at least one object during execution of the program or function that dynamically allocated the at least one object to determine if the at least one object is referenced outside the program or function; and if the at least one object is referenced outside the program or function, setting the marker to indicate that the at least one object is not local.

5. A method as recited in claim 1, wherein the at least one object is local to the program or function and is reclaimed prior to operation of the main garbage collector.

6. A method as recited in claim 1, wherein the at least one object is referenced in a referencing object, the method further comprising an act of setting the marker of the at least one object to indicate that the at least one object is not local if (i) the referencing object and the at least one object are allocated by a different program or function, or (ii) the referencing object is referenced outside the program or function.

7. A method as recited in claim 1, wherein the program or function is executed within a Java virtual machine.

8. In a computer system that includes a processing unit, a system memory, and a plurality of program modules, wherein at least a portion of the system memory comprises a heap from which objects may be dynamically allocated, and wherein the plurality of program modules include one or more programs or functions dynamically allocating memory from the heap for one or more objects and a main garbage collector that typically examines the entire heap when periodically attempting to reclaim memory dynamically allocated by the one or more programs or functions for the one or more objects, a computer program product comprising:

a computer readable medium having stored thereon executable instructions for implementing a method of reclaiming at least some dynamically allocated memory associated with the one or more objects immediately after the function or program that allocated the one or more objects either terminates or exits rather than waiting for the main garbage collector;

and wherein the method performed by said executable instructions comprises:

an act of, for an object that has been allocated, storing additional information within the object itself that includes a marker indicating whether the object is local to the function or program that dynamically allocated the object in the first instance;

an act of, immediately after the function or program that initially dynamically allocated the object either terminates or exits and prior to when the main garbage collector attempts to reclaim memory, examining the additional information for at least one object allocated by the function or program to determine if the at least one object has a marker indicating that it is local to the function or program;

if the at least one object is local to the function or program, then performing a step for reclaiming the dynamically allocated memory associated with the at least one object; and if the at least one object is not local to the function or program, then performing a step for deferring to a later time any further attempt to reclaim the dynamically allocated memory associated with the at least one object.

9. A computer program product as recited in claim 8, the method further comprising acts of:

prior to allocating any object, saving a beginning heap location from which objects may be dyamically allocated;

saving an end heap location of a last object to be dynamically allocated; and between the beginning heap location and the ending heap location, fetching one or more objects from the heap to examine the additional information for each of the one or more objects and to determine if each of the one or more objects is local, wherein the fetching includes the at least one object.

10. A computer program product as recited in claim 9, wherein the additional information includes a thread identifier and a stack identifier, the method further comprising an act of examining the additional information for each of the one or more objects fetched from the heap to determine which of the one or more objects fetched from the heap were allocated by the program or function.

11. A computer program product as recited in claim 8, the method further comprising acts of:

continuously monitoring the at least one object during execution of the program or function that dynamically allocated the at least one object to determine if the at least one object is referenced outside the program or function; and if the at least one object is referenced outside the program or function, setting the marker to indicate that the at least one object is not local.

12. A computer program product as recited in claim 8, wherein the at least one object is local to the program or function and is reclaimed prior to operation of the main garbage collector.

13. A computer program product as recited in claim 8, wherein the at least one object is referenced in a referencing object, the method further comprising an act of setting the marker of the at least one object to indicate that the at least one object is not local if (i) the referencing object and the at least one object are allocated by a different program or function, or (ii) the referencing object is referenced outside the program or function.

14. A compute program product as recited in claim 8, wherein the program or function is executed within a Java virtual machine.

15. In a computer system that includes a processing unit, a system memory, and a plurality of program modules, wherein at least a portion of the system memory comprises a heap from which objects may be dynamically allocated, and wherein the plurality of program modules include one or more programs or functions dynamically allocating memory from the heap for one or more objects and a main garbage collector that typically examines the entire heap when periodically attempting to reclaim memory dynamically allocated by the one or more programs or functions for the one or more objects, a method of reclaiming at least some dynamically allocated memory associated with the one or more objects immediately after the function or program that allocated the one or more objects either terminates or exits rather than waiting for the main garbage collector, the method comprising steps for:

for an object that has been allocated, associating with the object additional information which indicates whether the object is local to a function or program that dynamically allocated the object in the first instance;

immediately after the function or program that initially dynamically allocated the object either terminates or exits and prior to when the main garbage collector attempts to reclaim memory, examining the additional information for at least one object allocated by the function or program to determine if the at least one object has additional information associated with it that indicates that it is local to the function or program;

if the at least one object is local to the function or program, reclaiming the dynamically allocated memory associated with the at least one object; and if the at least one object is not local to the function or program, deferring to a later time any further attempt to reclaim the dynamically allocated memory associated with the at least one object.

16. A method as recited in claim 15, further comprising steps for:

determining a range of locations to scan for any objects allocated by the program or function; and scanning only the range of locations for the at least one object and associated additional information.

17. A method as recited in claim 16, wherein the additional information identifies the function or program that dynamically allocated the object in the first istance and a corresponding thread of execution, the method further comprising a step for determining which of one or more objects within the range of locations were allocated by the program or function in the corresponding thread of execution, based on the additional information that is associated with each of the one or more objects.

18. A method as recited in claim 15, further comprising a step of indicating that the at least one object is not local if, during execution of the program or function, the at least one object is referenced outside of the program or function.

19. A method as recited in claim 15, wherein the at least one object is local to the program or function and is reclaimed prior to operation of the main garbage collector.

20. A method as recited in claim 15, wherein the at least one object is referenced in a referencing object, the method further comprising a step for indicating that the at least one object is not local if (i) the referencing object and the at least one object are allocated by a different program or function, or (ii) the referencing object is referenced outside the program or function.

21. A method as recited in claim 15, wherein the program or function is executed within a Java virtual machine.

22. In a computer system that includes a processing unit, a system memory, and a plurality of program modules, wherein at least a portion of the system memory comprises a heap from which objects may be dynamically allocated, and wherein the plurality of program modules include one or more programs or functions dynamically allocating memory from the heap for one or more objects and a main garbage collector that typically examines the entire heap when periodically attempting to reclaim memory dynamically allocated by the one or more programs or functions for the one or more objects, a computer program product comprising:

a computer readable medium having stored thereon executable instructions for implementing a method of reclaiming at least some dynamically allocated memory associated with the one or more objects immediately after the function or program that allocated the one or more objects either terminates or exits rather than waiting for the main garbage collector;

and wherein the method performed by said executable instructions comprises steps of:

for an object that has been allocated, associating with the object additional information which indicates whether the object is local to a function or program that dynamically allocated the object in the first instance;

immediately after the function or program that initially dynamically allocated the object either terminates or exits and prior to when the main garbage collector attempts to reclaim memory, examining the additional information for at least one object allocated by the function or program to determine if the at least one object has additional information associated with it that indicates that it is local to the function or program;

if the at least one object is local to the function or program, reclaiming the dynamically allocated memory associated with the at least one object; and if the at least one object is not local to the function or program, deferring to a later time any further attempt to reclaim the dynamically allocated memory associated with the at least one object.

23. A computer program product as recited in claim 22, the method further comprising steps of:

determining a range of locations to scan for any objects allocated by the program or function; and scanning only the range of locations for the at least one object and associated additional information.

24. A computer program product as recited in claim 23, wherein the additional information identifies the function or program that dynamically allocated the object in the first instance and a corresponding thread of execution, the method further comprising a step for determining which of one or more objects within the range of locations were allocated by the program or function in the corresponding thread of execution, based on the additional information that is associated with each of the one or more objects.

25. A computer program product as recited in claim 22, the method further comprising a step for indicating that the at least one object is not local if, during execution of the program or function, the at least one object is referenced outside the program or function.

26. A computer program product as recited in claim 22, wherein the at least one object is local to the program or function and is reclaimed prior to operation of the main garbage collector.

27. A computer program product as recited in claim 22, wherein the at least one object is referenced in a referencing object, the method further comprising a step for indicating that the at least one object is not local if (i) the referencing object and the at least one object are allocated by a different program or function, or (ii) the referencing object is referenced outside the program or function.

28. A computer program product as recited in claim 22, wherein the program or function is executed with a Java virtual machine.

* * * * *

UNITED STATES PATENT AND TRADEMARK OFFICE
CERTIFICATE OF CORRECTION

PATENT NO.    : 6,353,838 B1                              Page 1 of 1
DATED         : March 5, 2002
INVENTOR(S)   : David M. Sauntry, Michael E. Markley and Mark Gilbert It is certified that error appears in the above-identified patent and that said Letters Patent is hereby corrected as shown below:

<u>Column 10,</u>
Line 34, after "A" change "compute" to -- computer --

<u>Column 11,</u>
Line 13, after "first" change "istance" to -- instance --
Line 57, after "steps" change "of" to -- for --

Signed and Sealed this

Twenty-first Day of May, 2002

Attest:

Attesting Officer

JAMES E. ROGAN
*Director of the United States Patent and Trademark Office*